United States Patent
Nammi

(10) Patent No.: US 10,461,786 B2
(45) Date of Patent: Oct. 29, 2019

(54) APPARATUS AND METHOD FOR CONTROLLING AMPLIFIERS

(71) Applicant: Telefonaktiebolaget LM Ericsson (publ), Stockholm (SE)

(72) Inventor: SaiRamesh Nammi, Austin, TX (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/778,152

(22) PCT Filed: Dec. 7, 2015

(86) PCT No.: PCT/EP2015/078874
§ 371 (c)(1),
(2) Date: May 22, 2018

(87) PCT Pub. No.: WO2017/097335
PCT Pub. Date: Jun. 15, 2017

(65) Prior Publication Data
US 2018/0351587 A1    Dec. 6, 2018

(51) Int. Cl.
*H04B 1/04* (2006.01)
*H04B 7/0413* (2017.01)

(52) U.S. Cl.
CPC ......... *H04B 1/0475* (2013.01); *H04B 7/0413* (2013.01); *H04B 2001/0425* (2013.01)

(58) Field of Classification Search
CPC .................................................. H04B 1/0475
USPC ........................................................ 375/297
See application file for complete search history.

(56) References Cited

U.S. PATENT DOCUMENTS

| | | | |
|---|---|---|---|
| 2008/0207143 A1 | 8/2008 | Skarby et al. | |
| 2012/0313700 A1 | 12/2012 | Bai | |
| 2014/0133531 A1* | 5/2014 | Nguyen | H04L 27/367 375/219 |
| 2015/0049843 A1 | 2/2015 | Reuven et al. | |
| 2015/0094078 A1* | 4/2015 | Cheadle | H04W 52/146 455/452.1 |
| 2016/0373971 A1* | 12/2016 | Kulal | H04W 24/02 |

FOREIGN PATENT DOCUMENTS

EP    2592750 A1    5/2013

OTHER PUBLICATIONS

International Search Report and Written Opinion dated Jun. 29, 2016 for International Application No. PCT/SE2015/078874 filed on Dec. 7, 2015, consisting of 12-pages.
Bassam et al. "Crossover Digital Predistorter for the Compensation of Crosstalk and Nonlinearity in MIMO Transmitters"; IEEE Transactions on Microwave Theory and Techniques, vol. 57, No. 5, May 2009, consisting of 10-pages.

* cited by examiner

*Primary Examiner* — Lihong Yu
(74) *Attorney, Agent, or Firm* — Sage Patent Group

(57) ABSTRACT

A method of controlling one or more amplifiers of a network node, wherein the network node is adapted to communicate with a plurality of user equipment devices within a cell of a wireless communication network. The method comprises evaluating back-off criteria relating to the plurality of user equipment devices, and selectively controlling one or more amplifiers to operate in a reduced power mode or a predistortion mode, based on the result of the evaluation.

16 Claims, 17 Drawing Sheets

APPARATUS AND METHOD FOR CONTROLLING AMPLIFIERS

CROSS-REFERENCE TO RELATED APPLICATION

This application is a Submission Under 35 U.S.C. § 371 for U.S. National Stage Patent Application of International Application Number: PCT/EP2015/078874, filed Dec. 7, 2015 entitled "APPARATUS AND METHOD FOR CONTROLLING AMPLIFIERS," the entirety of which is incorporated herein by reference.

TECHNICAL FIELD

The present disclosure relates to an apparatus and method for controlling amplifiers, and in particular to an apparatus and method for controlling power amplifiers, for example power amplifiers used in active antenna systems.

BACKGROUND

The use of active-array-antenna systems (AAS) is becoming increasingly popular in communication systems, for example where radio frequency (RF) components such as power amplifiers and transceivers are integrated with an array of antenna elements. FIG. 1 shows an example of such a system, comprising an array of antenna elements $10_1$ to $10_N$, power amplifiers $20_1$ to $20_N$, (for example each comprising a transmit power amplifier, e.g. $20_{1A}$, and a receive power amplifier, e.g. $20_{1B}$), and baseband processing circuitry 30 for processing signals being transmitted to, or received from the antenna array. Such a system can be controlled to provide beam forming, for example a beam 40.

Active-array-antenna systems offer several benefits compared to traditional deployments that utilize passive antennas connected to transceivers through feeder cables, for example such as those shown in FIG. 2. In the passive antenna array system depicted in FIG. 2, baseband signals from/to the baseband processing circuitry 30 are boosted using power amplifiers $50_1/50_2$, which are connected to the antenna elements $10_1$ to $10_N$ via a passive power combiner/driver and phase shifting circuit 60 using long feeder cables. It is noted that, for simplicity, other blocks such as digital analog converters (DACs), Oscillators, up/down converters etc., have been omitted from FIG. 2.

By using active antenna arrays of the type shown in FIG. 1, not only are cable losses reduced, leading to improved performance and reduced energy consumption, but the installation is also simplified, and the required equipment space is therefore reduced.

There are many applications of active antennas, for example cell specific beamforming, user specific beamforming, vertical sectorization, massive multiple-input-multiple-output (MIMO), elevation beamforming etc., and these may also be enablers for further-advanced antenna concepts, such as deploying a large number of MIMO antenna elements at a network node, such as an eNode B. Consideration is also being given to study full-dimensional MIMO (FD-MIMO), which explores the feasibility of increasing the number of transmit antennas to 16/32/64 for various purposes.

Power amplifiers are typically used in active antenna systems. In general, power amplifiers need to be operated in the non-linear region for achieving good efficiency. FIG. 3 shows a typical AM/AM curve for a power amplifier. We can observe that the input/output curve is highly non-linear.

However, when the power amplifier operates in the non-linear region, some of the signals are leaked to the other frequency bands. FIG. 4 shows an example of the spectral regrowth that can occur due to the non-linearity of a power amplifier (curve 41 corresponding to that of an ideal power amplifier, and curve 43 corresponding to that of a realistic power amplifier with non-linearity).

Adjacent Channel Leakage Ratio (ACLR) can be used as a metric to measure the leakage due to non-linear power amplifiers. In FIG. 4 the ACLR for an ideal power amplifier is around −78.1 dBc, while for a realistic power amplifier (with non-linearity), the ACLR is around −41.1 dBc.

One method to compensate for the non-linearity of the power amplifier is to distort the input signal to the power amplifier, such that the output signal from the power amplifier is transformed to be close to what it would have been if the power amplifier would have been linear. Digital predistortion techniques (DPD), for example, operate in this way.

FIG. 5 shows the spectral regrowth when DPD is used, whereby curve 41 corresponds to that of an ideal power amplifier, curve 43 corresponds to that of a realistic power amplifier with non-linearity, and curve 45 to that of a power amplifier using DPD. It can be seen that the spectral regrowth is reduced when DPD is applied. In this case the ACLR is improved to be around −60 dBc.

In a MIMO system using AAS, in addition to problems related to non-linear power amplifiers, the signals from the adjacent elements can leak and corrupt the desired signal. Since an AAS base station can be integrated in a limited volume, it is reasonable to assume that mutual coupling between antenna elements is stronger than 30 dB, even in a system not intended to perform cell-specific beam-forming. This is referred to as mutual coupling, crosstalk or antenna port-to-port isolation. In effect, the leaked signal appears as a reverse intermodulation signal at the transceiver output. In particular, if the signals transmitted from the transceivers are uncorrelated (as is likely to be the case to some degree in a MIMO system), then the reverse intermodulation signal can cause disturbances to the operation of control algorithms such as digital predistortion (DPD). If, however, the transceivers are transmitting fully correlated signals, then the impact to DPD is not as severe. It can be noted that if the transmission rank (i.e. number of independently modulated data streams) is the same as the number of transmit branches, the signals are in general uncorrelated, while if a low rank signal is transmitted over many antenna branches, the signals are in general more correlated.

For MIMO systems, when the transmission rank is equal to 1, the signals from the transceivers are perfectly correlated. If the rank is greater than 1, the signals are to some extent uncorrelated. Also, if transmit diversity is applied, then the signals are uncorrelated. The impact due to cross talk can be more severe when the distance between the antenna elements is very small.

FIG. 6 shows an example of the spectral regrowth due to mutual coupling with different mutual coupling values in dB (also shown is the distance between elements). Curve 61 corresponds to no mutual coupling, curve 62 corresponds to a mutual coupling of −34 dB or distance d=1.0λ, curve 63 corresponds to a mutual coupling of −44 dB or distance d=1.5λ, curve 64 corresponds to a mutual coupling of −27 dB or distance d=0.75λ, curve 65 corresponds to a mutual coupling of −11 dB or distance d=0.35λ, and curve 66 corresponds to a non-linear amplifier without DPD. It can be seen that as the mutual coupling value increases (i.e. the distance between the elements decreases), the spectrum moves away from the ideal power amplifier, due to the operation of the DPD being disturbed. This implies that it does not meet the requirements as set by 3GPP.

It should be noted that transceivers driving different radiating elements may experience different levels of coupling. Thus, spectral regrowth effects may be more severe for some transceivers than for others.

To mitigate the impact due to mutual coupling, crossover digital pre distortion (CO-DPD) techniques have been proposed, which take the mutual coupling into consideration in the DPD formulation. Hence the DPD techniques can be divided into two main types.

Type A DPD technique: All conventional DPD techniques fall under this category. These techniques do not take mutual coupling effects into consideration when formulating the DPD coefficients.

Type B DPD technique: This type of DPD technique takes into consideration the mutual coupling and associated reverse intermodulation signals when formulating the DPD coefficients. Another category where the mutual coupling is estimated and cancelled before passing to the DPD also comes under this category.

In general, both the DPD techniques (i.e. those which consider mutual coupling between the antenna elements, as well as those which do not take mutual coupling between antenna elements into consideration) require large computational resources and power at the transmission side. The DPD loop needs to be operated continuously. Thus, in a large MIMO system or in a system with many transmit antennas (antenna elements), running a DPD loop for all the antenna elements can be cumbersome and drain the power.

One solution is to reduce the power of the power amplifier, i.e. use power amplifier back-off. FIG. 7 shows the ACLR value in dBc vs power amplifier power offset with a mutual coupling of 11 dB. It can be observed that to meet the requirement of say −50 dBc the power amplifier back-off value should be at least 3 dB.

However, reducing the power of the power amplifier has the disadvantage of reducing the coverage of a cell. FIG. 8 shows system throughput as a function of power back-off. The simulations are carried out in a 57 sector system simulator. The power amplifier back-off is applied only at the center cell, while maintaining constant power for the remaining 56 cells. The statistics are shown for the center cell, with curve 81 relating to the cell edge, curve 83 relating to the cell average, and curve 85 relating to the cell peak. It can be seen that coverage (usually measured by cell edge user throughput) is almost zero when there is a power amplifier back-off by 3 dB.

FIG. 9 shows the throughput loss in percentage terms, as a function of back-off value (again with curve 81 relating to the cell edge, curve 83 relating to the cell average, and curve 85 relating to the cell peak). It can be seen from FIG. 9 that the loss is more severe at the cell edge than the cell center.

SUMMARY

It is an aim of the present invention to provide a method and apparatus which obviate or reduce at least one or more of the disadvantages mentioned above.

According to a first aspect there is provided a method of controlling one or more amplifiers of a network node, wherein the network node is adapted to communicate with a plurality of user equipment devices within a cell of a wireless communication network. The method comprises evaluating back-off criteria relating to the plurality of user equipment devices. The method comprises selectively controlling one or more amplifiers to operate in a reduced power mode or a predistortion mode, based on the result of the evaluation.

According to another aspect there is provided a network node comprising one or more amplifiers, wherein the network node is adapted to communicate with a plurality of user equipment devices within a cell of a wireless communication network. The network node comprises an evaluation unit configured to evaluate back-off criteria relating to the plurality of user equipment devices. The network node comprises a control unit configured to selectively control one or more amplifiers to operate in a reduced power mode or a predistortion mode, based on the result of the evaluation.

According to another aspect there is provided a user equipment device comprising one or more amplifiers for communicating with a network node of a wireless communication network. The user equipment device comprises an evaluation unit configured to evaluate back-off criteria between the user equipment device and the network node. The user equipment device comprises a control unit configured to selectively control one or more amplifiers to operate in a reduced power mode or a predistortion mode, based on the result of the evaluation.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
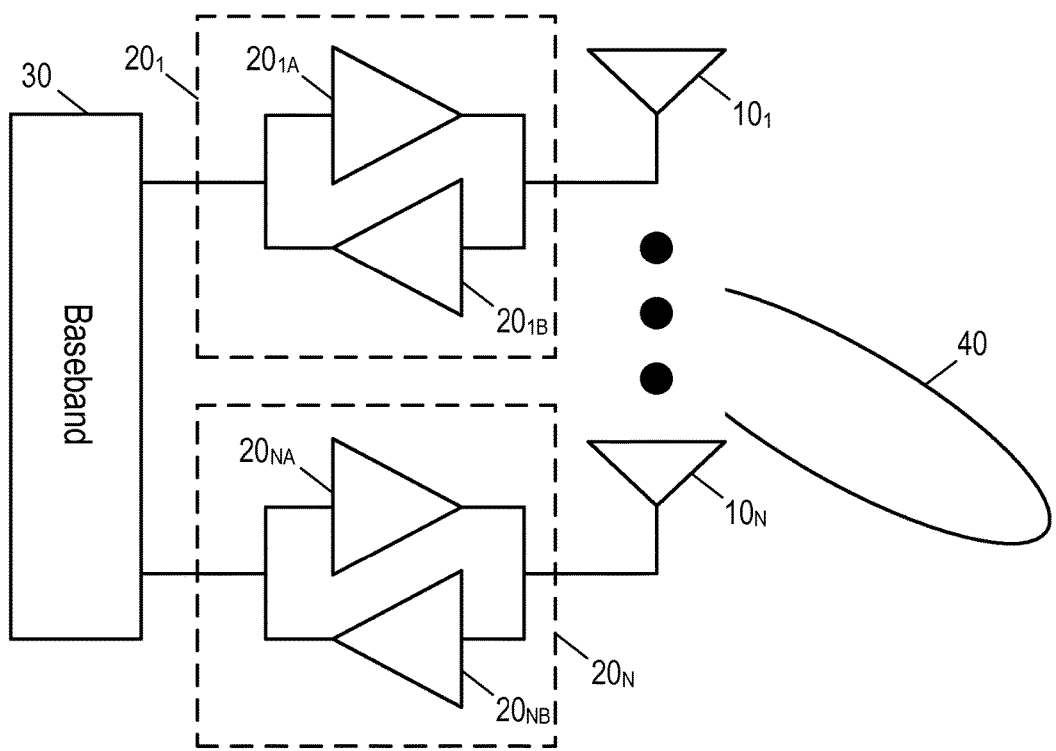
FIG. 1 shows an example of an active antenna array system.
Figure 2:
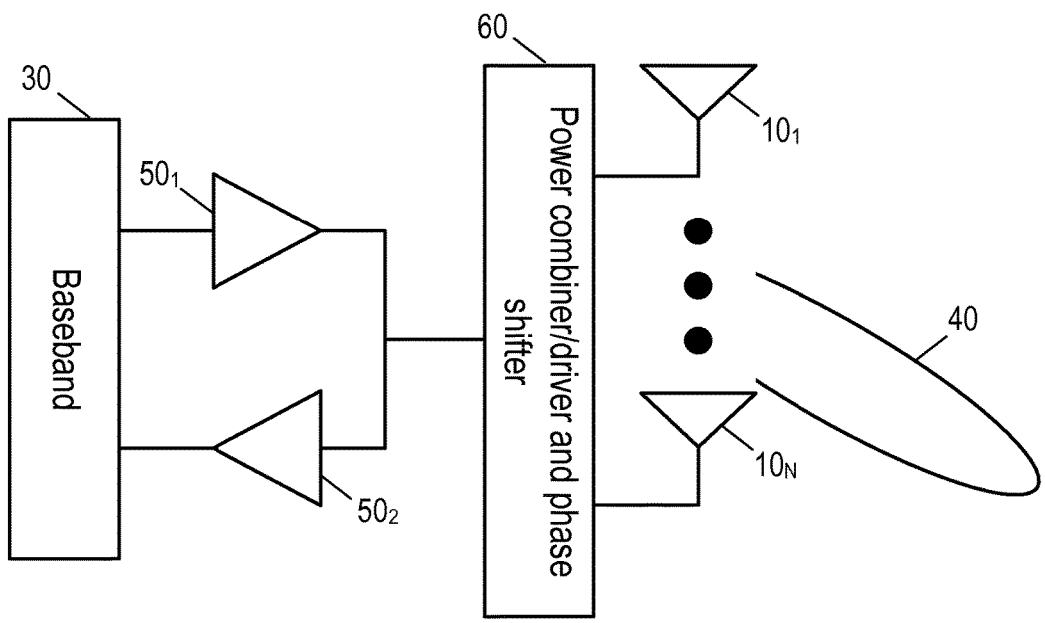
FIG. 2 shows an example of a passive antenna array system.
Figure 3:
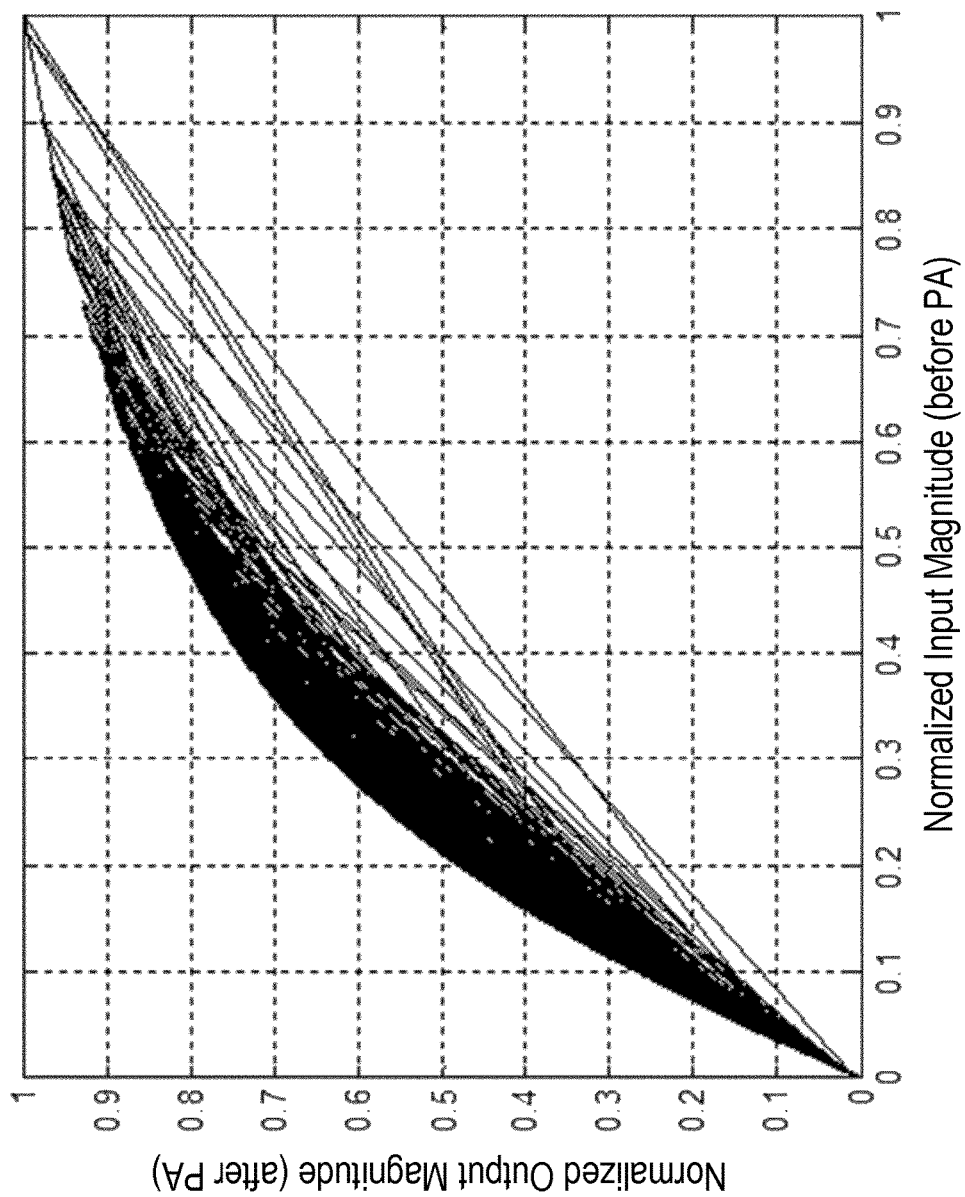
FIG. 3 shows a typical AM/AM performance of a power amplifier.
Figure 4:
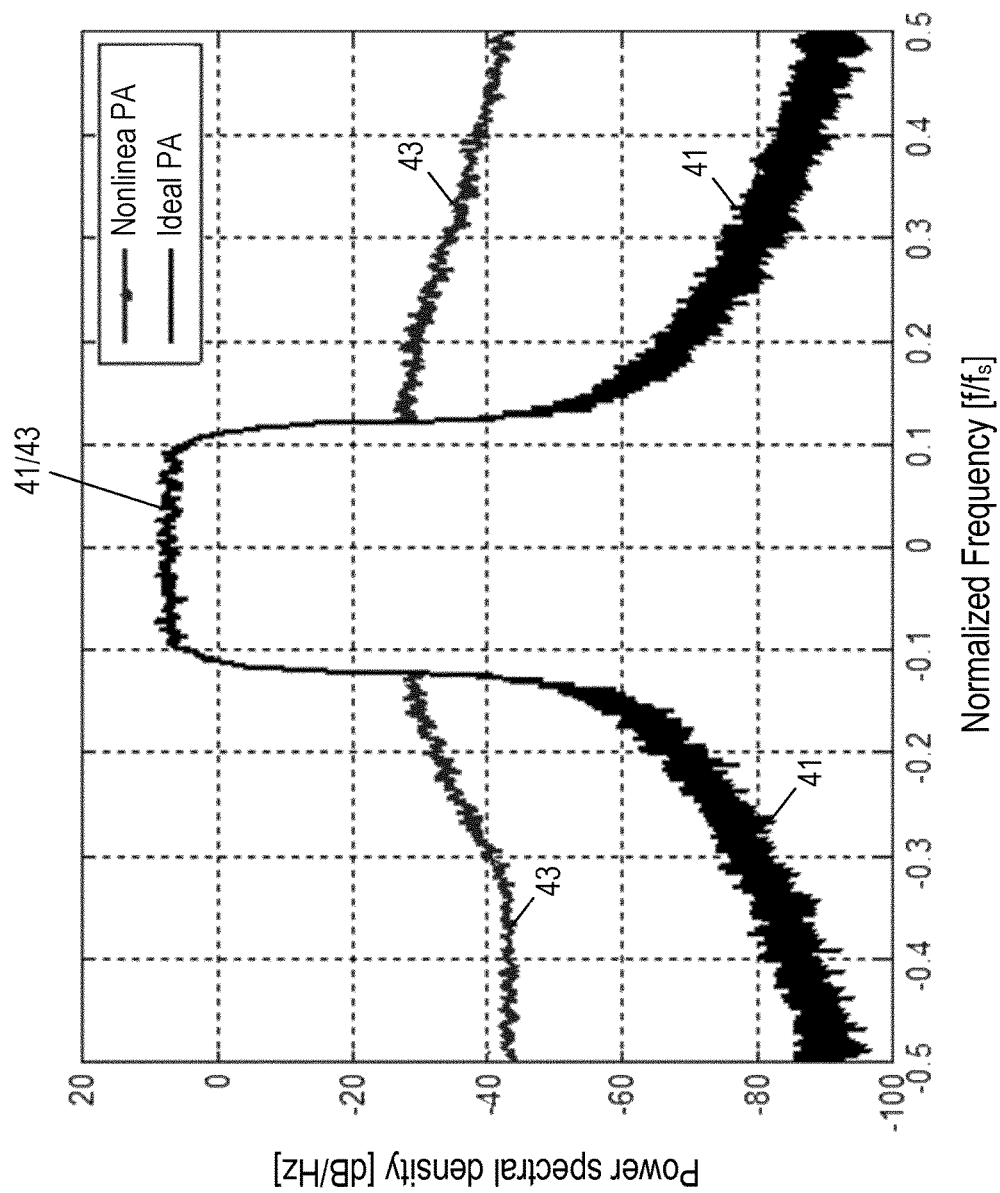
FIG. 4 shows an example of power spectral density with a realistic power amplifier, comparing a non-linear power amplifier and an ideal amplifier.
Figure 5:
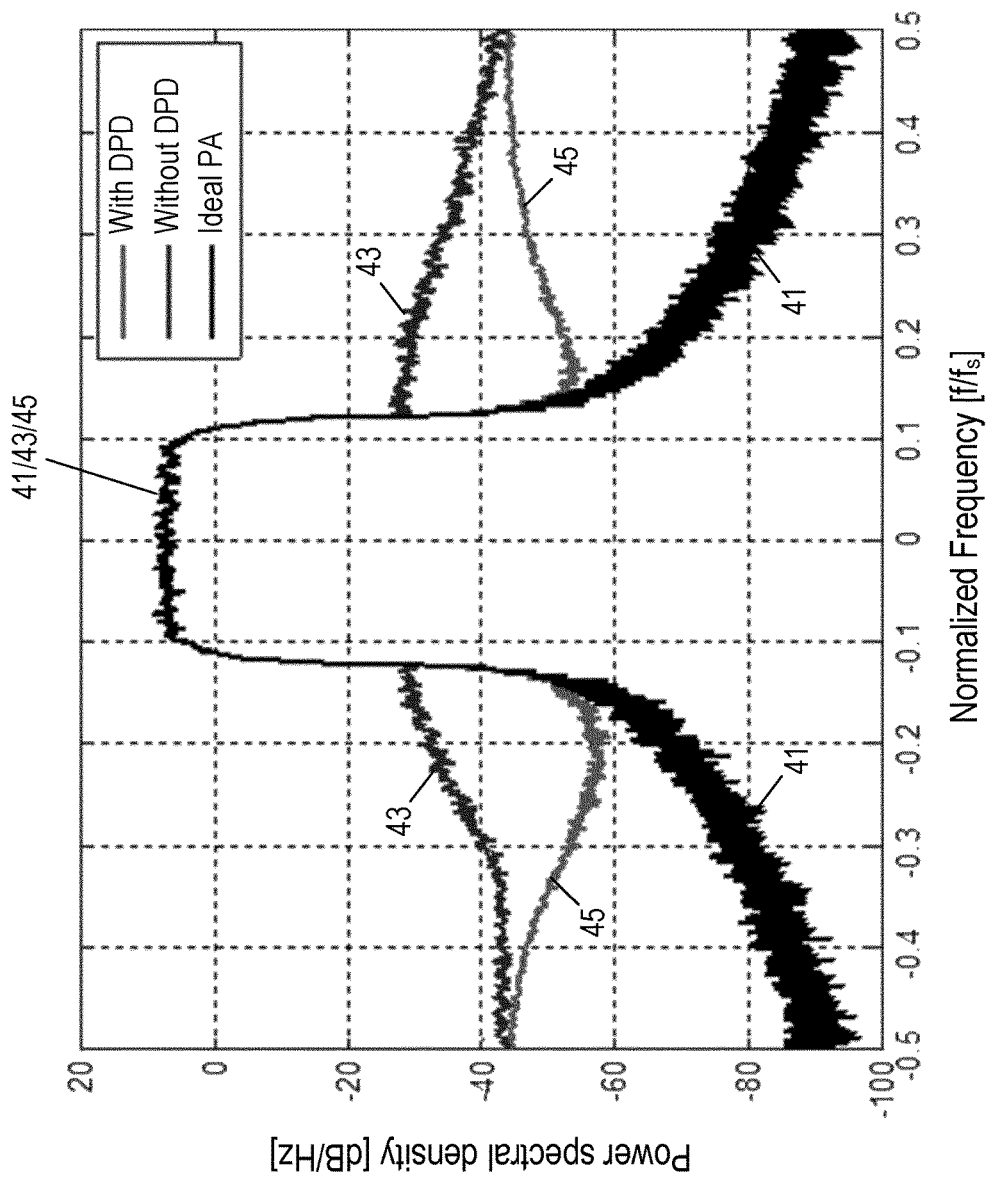
FIG. 5 shows an example of power spectral density with a realistic power amplifier, comparing an ideal amplifier and a non-linear amplifier with and without digital pre-distortion, DPD.
Figure 6:
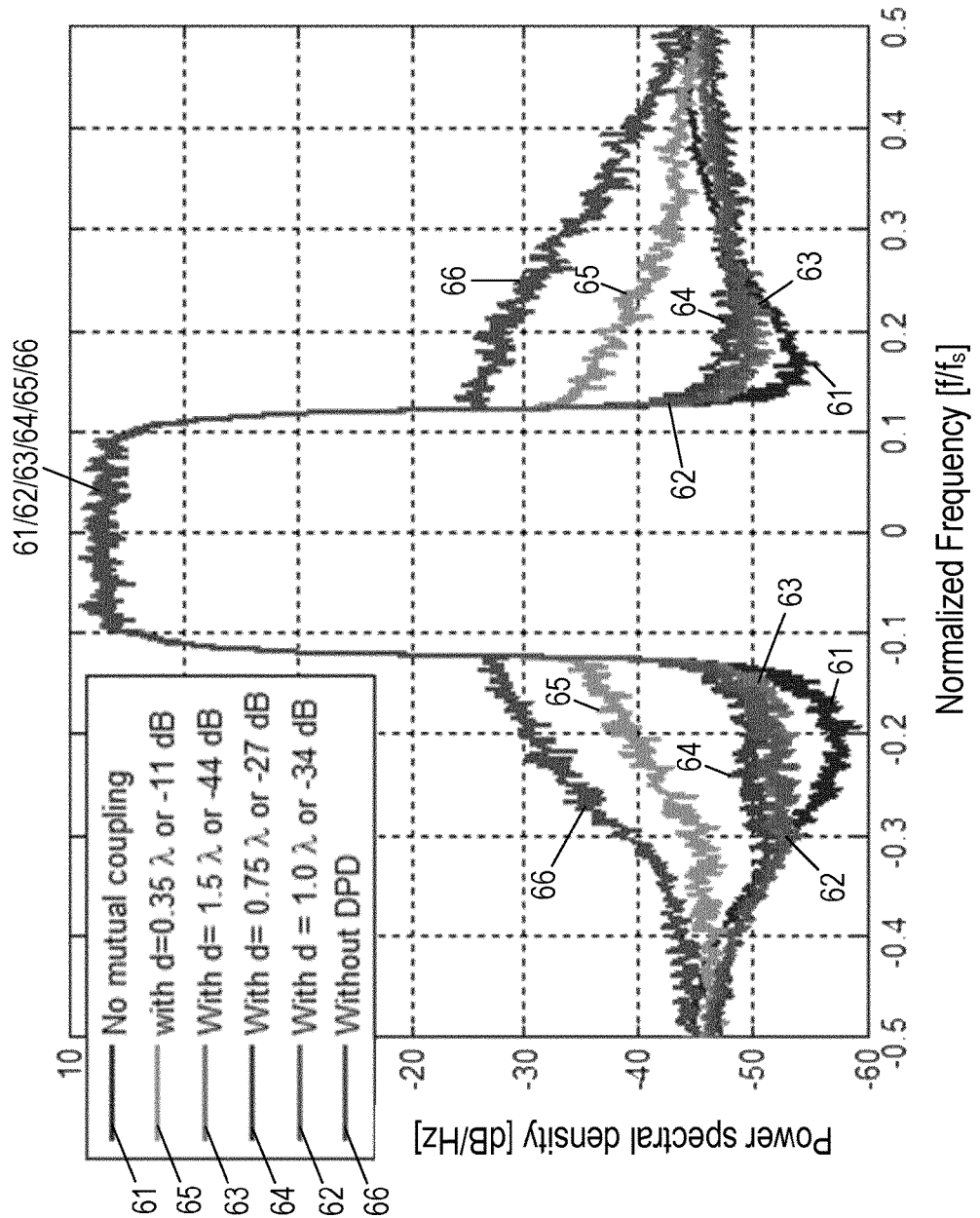
FIG. 6 shows examples of power spectral density with various values of mutual coupling.
Figure 7:
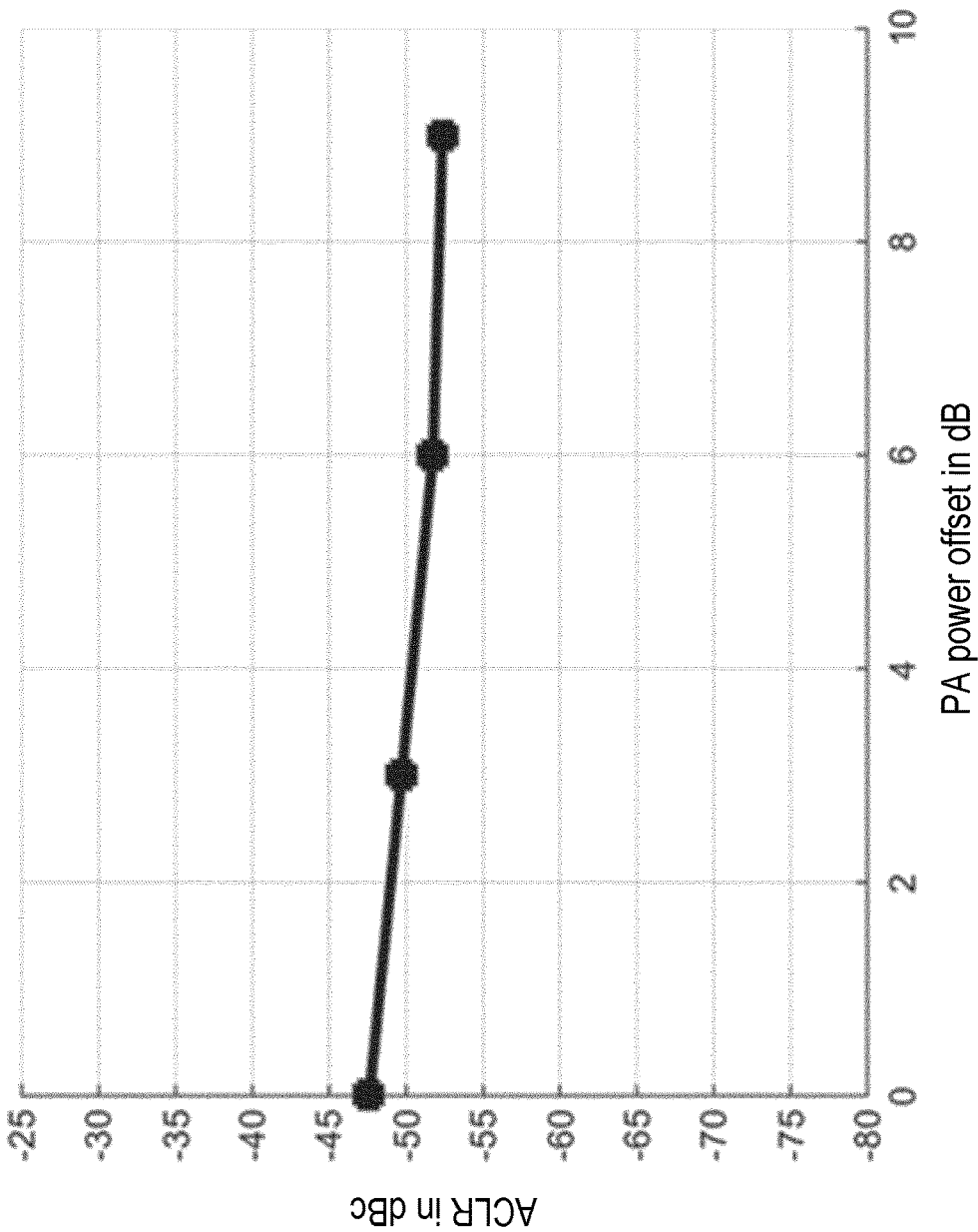
FIG. 7 shows an example of the relationship between Adjacent Channel Leakage Ratio, ACLR, against power offset.
Figure 8:
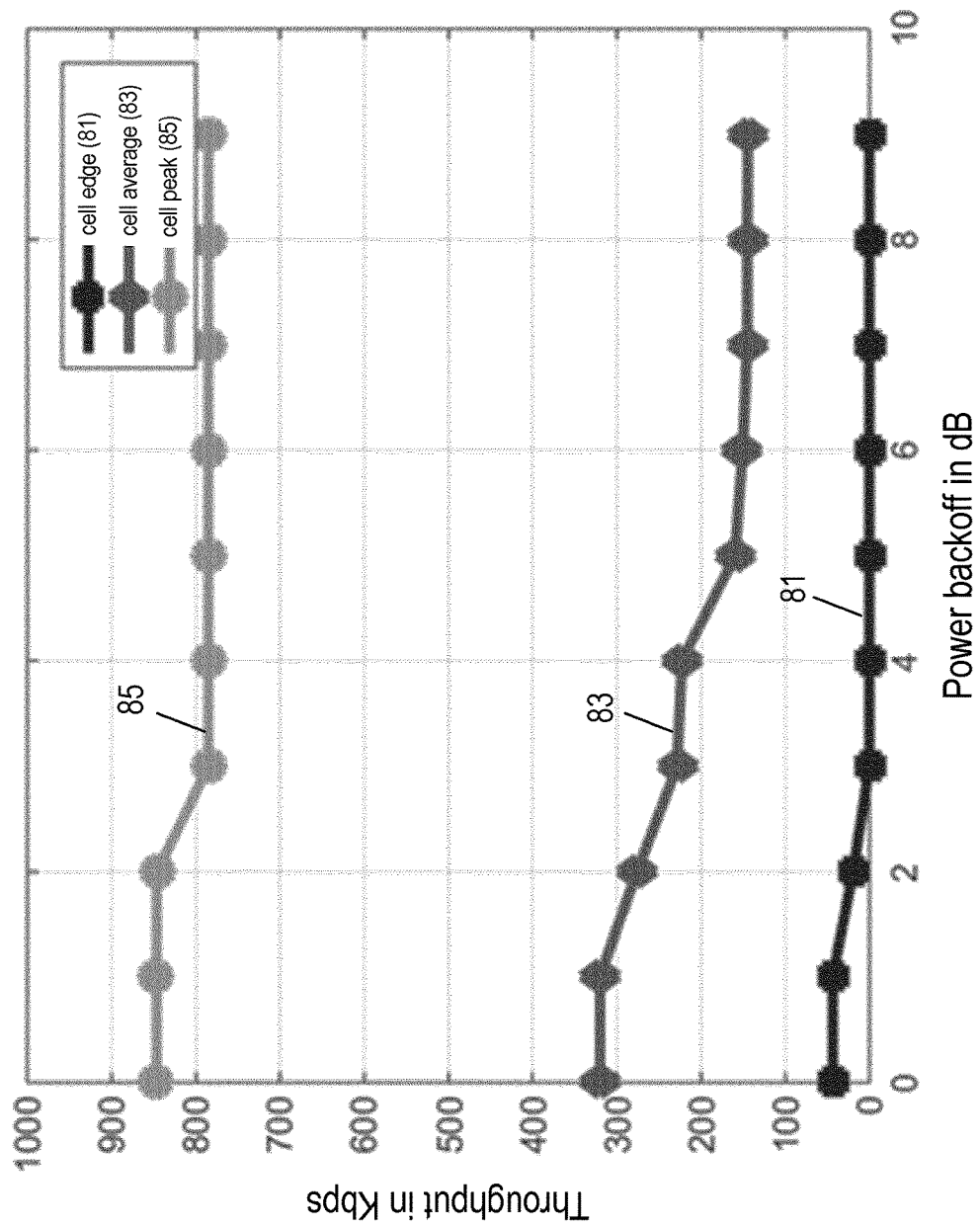
FIG. 8 shows an example of system throughput as a function of power offset.
Figure 9:
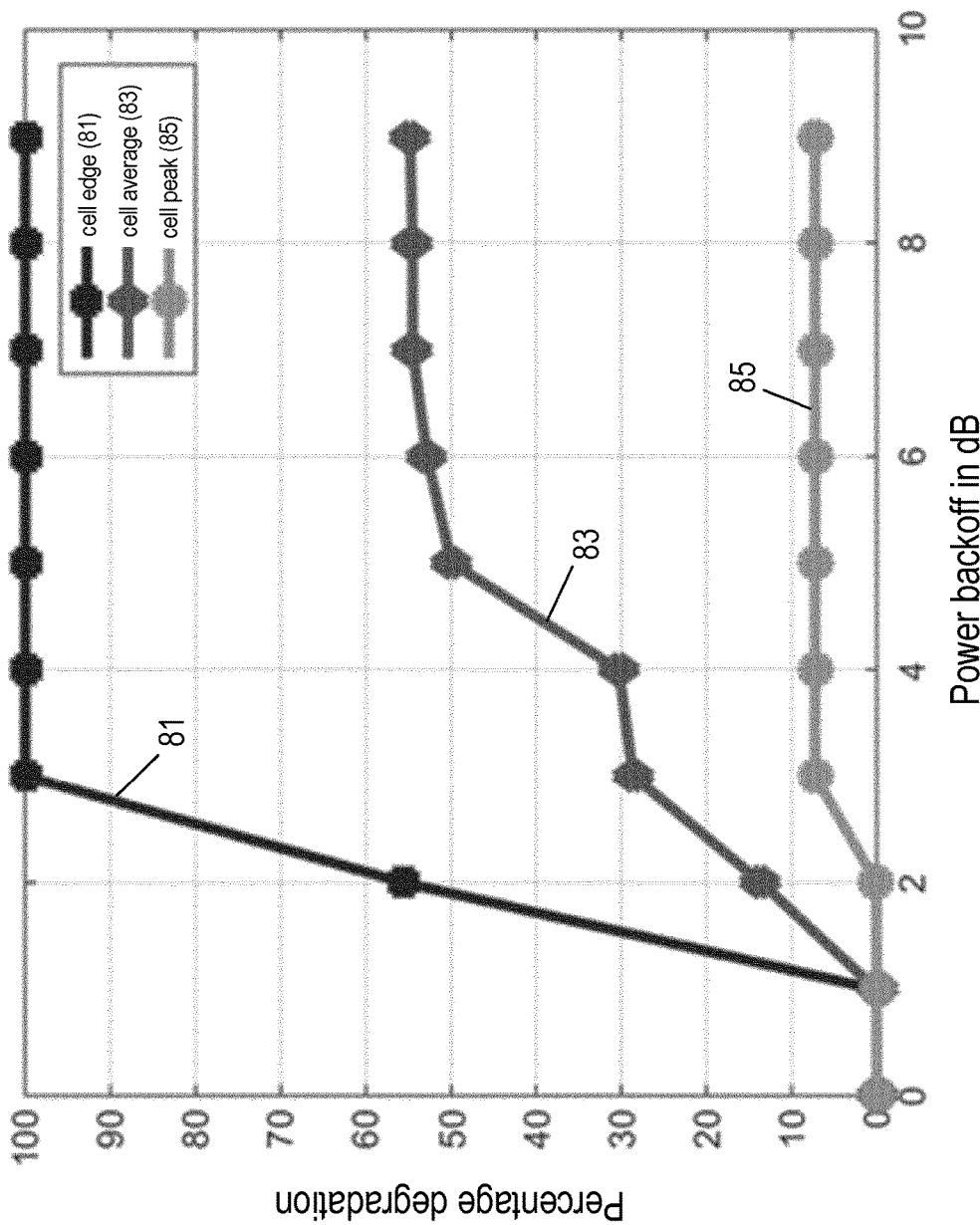
FIG. 9 shows an example of percentage degradation in system throughput as a function of power offset.
Figure 10:
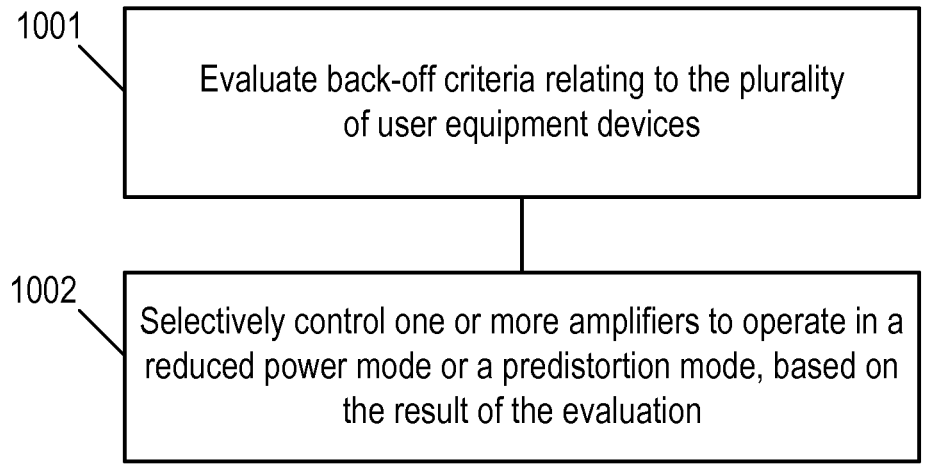
FIG. 10 shows an example of a method according to an embodiment.

FIG. 10 shows an example of a method according to a first embodiment, of controlling one or more amplifiers of a network node, wherein the network node is adapted to communicate with a plurality of user equipment devices within a cell of a wireless communication network. The method comprises evaluating back-off criteria relating to the plurality of user equipment devices, step 1001. The method further comprises the step of selectively controlling one or more amplifiers to operate in a reduced power mode or a predistortion mode, based on the result of the evaluation, step 1002.

By being able to selectively switch between a reduced power mode and a predistortion mode, based on some form of back-off criteria, this enables for example a reduced power mode to be used when appropriate, and a predistortion mode to be used in other circumstances.

In one embodiment the back-off criteria relates to a signal quality parameter between the network node and the plurality of user equipment devices. For example, the signal quality parameter may comprise one or more of a signal to interference ratio, SINR, between the network node and the user equipment devices, or a path loss between the network node and the user equipment devices.

In the embodiment of FIG. 10, and the other embodiments described herein, it is noted that references to the term amplifier include references to a power amplifier, PA.

Figure 11:
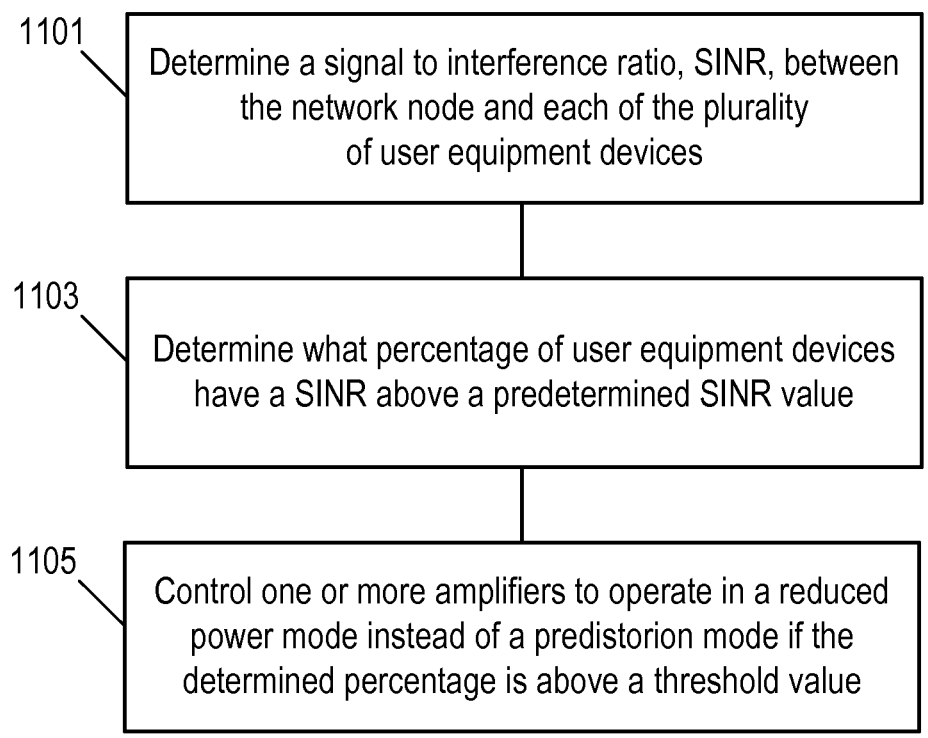
FIG. 11 shows an example of a method according to an embodiment.

FIG. 11 shows an example of a method according to another embodiment. The method comprises determining a signal to interference ratio, SINR, between the network node and each of the plurality of user equipment devices, step 1101. In step 1103, the method comprises determining what percentage of user equipment devices have a SINR above a predetermined SINR value. One or more amplifiers are controlled, in step 1105, to operate in a reduced power mode instead of a predistortion mode if the determined percentage is above a threshold value. In one example, all of the amplifiers are controlled in this way.

Since the SIRN can be indicative of the relative positions of the user equipment devices within the cell, a high percentage of user equipment devices having a SINR above a predetermined SINR value can be an indication of the user equipment devices being located close a cell centre, which means that back-off can be used instead of predistortion.

Figure 12:
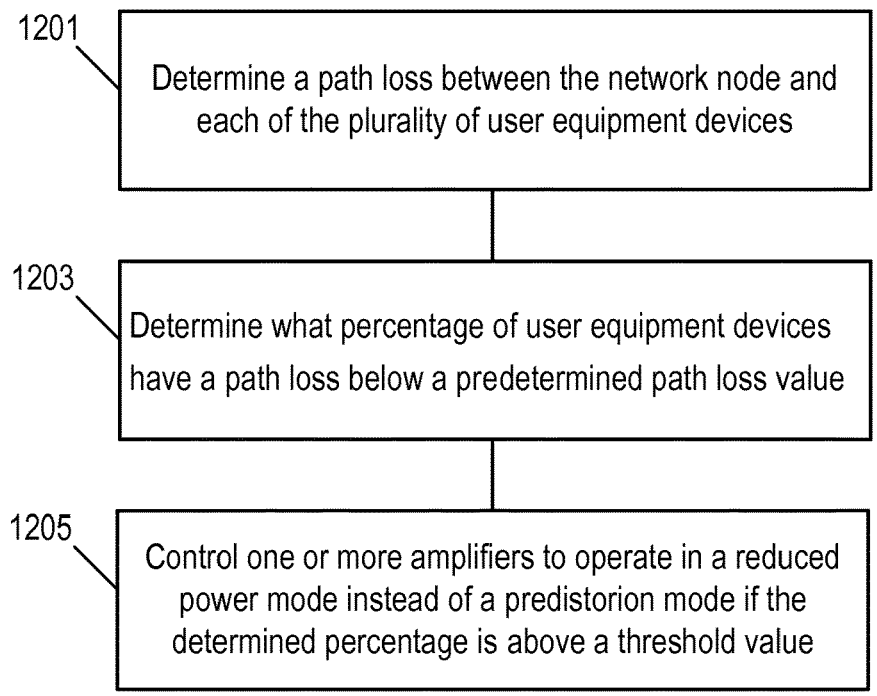
FIG. 12 shows an example of a method according to an embodiment.

FIG. 12 shows an example of a method according to another embodiment. The method comprises determining a path loss between the network node and each of the plurality of user equipment devices, step 1201. In step 1203, the method comprises determining what percentage of user equipment devices have a path loss below a predetermined path loss value. One or more amplifiers are controlled in step 1205 to operate in a reduced power mode instead of a predistortion mode if the determined percentage is above a threshold value. In one example, all of the amplifiers are controlled in this way.

In a similar way to the previous embodiment, since the path loss can be indicative of the relative positions of the UEs within the cell, a high percentage of user equipment devices having a path loss below a predetermined path loss value can be an indication of user equipment devices being located close to a cell centre, which means that back-off can be used.

Thus, in an example, if a network node finds that the majority of the UEs have a low path loss then it can apply the reduced power mode, such as PA back-off. It is noted that there are many ways a network node can measure the path loss of a UE. For example, from the uplink measurements a network node can estimate the path loss of the UE.

According to another embodiment the back-off criteria comprises positional information, or geometry, relating to the position of the plurality of user equipment devices within the cell.

Figure 13:
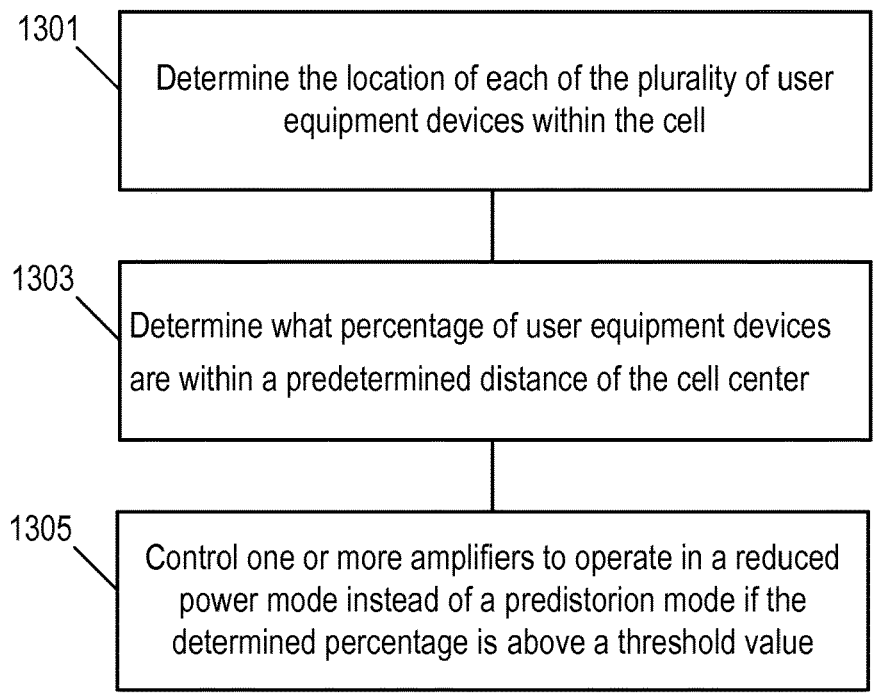
FIG. 13 shows an example of a method according to an embodiment.

FIG. 13 shows an example of a method according to such an embodiment. The method comprises determining the location of each of the plurality of user equipment devices within the cell, step 1301. In step 1303, the method comprises determining what percentage of user equipment devices are within a predetermined distance of the cell center. One or more amplifiers are controlled in step 1305 to operate in a reduced power mode instead of a predistortion mode if the determined percentage is above a threshold value. In one example, all of the amplifiers are controlled in this way.

In such an embodiment, based on geometry, if the network node identifies the majority of the UEs are at a cell center, then it can apply power amplifier back-off rather than using a predistortion technique such as DPD/CO-DPD. It is noted that there are many ways a network node can evaluate or measure the geometry of a UE. For example, from the UE measurements by averaging out the CQIs reported, i.e from the downlink measurements.

The reduced power mode may comprise, for example, a back-off mode of operation. This may comprise reducing the power of the amplifier such that it operates in a linear mode of operation, or a more linear mode of operation.

The predistortion mode may comprise an amplifier linearization technique, a digital pre-distortion technique, DPD, a crossover digital predistortion technique, CO-DPD, or an analog pre-distortion technique, APD. It is noted that other predistortion techniques may also be used.

Figure 14:
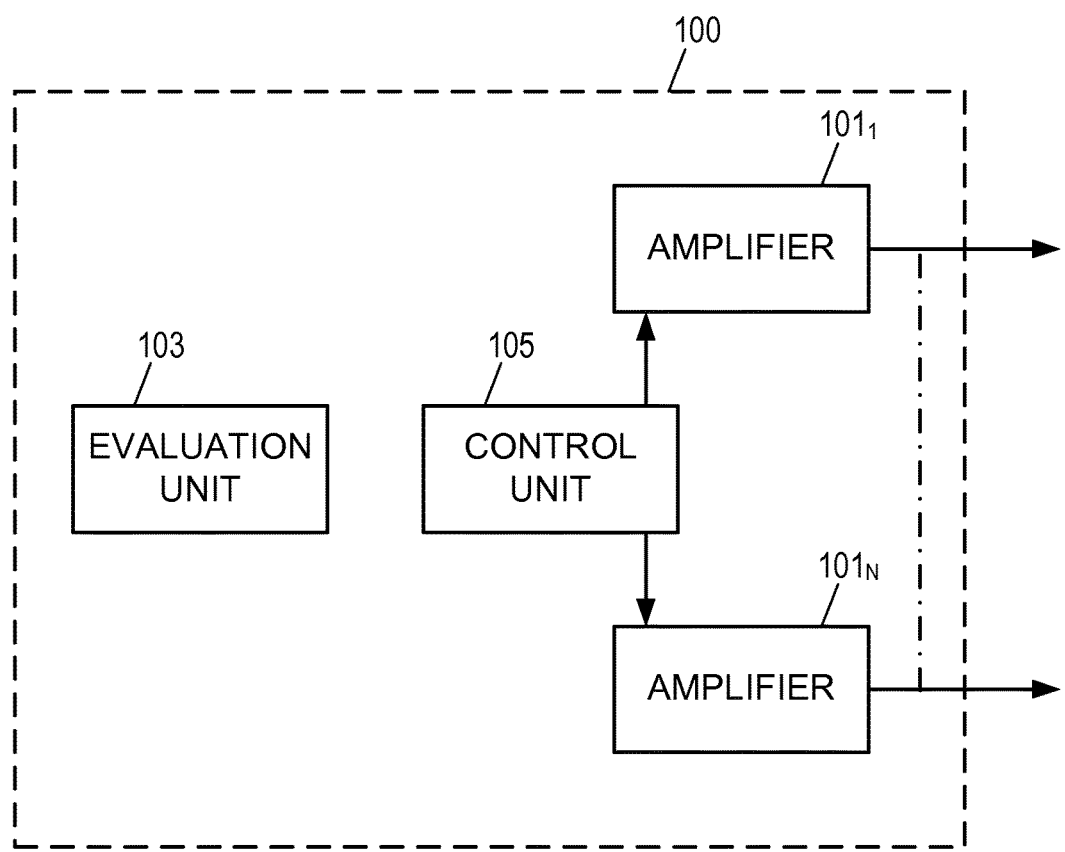
FIG. 14 shows an example of a network node according to an embodiment.

FIG. 14 shows an example of a network node 100 according to another embodiment. The network node 100 is adapted to communicate with a plurality of user equipment devices within a cell of a wireless communication network, and comprises one or more amplifiers $101_1$ to $101_N$. The network node 100 comprises an evaluation unit 103 configured to evaluate back-off criteria relating to the plurality of user equipment devices. The network node comprises a control unit 105 configured to selectively control one or more amplifiers $101_1$ to $101_N$ to operate in a reduced power mode or a predistortion mode, based on the result of the evaluation. In one example, all of the amplifiers are controlled in this way.

According to one embodiment, the evaluation unit 103 is configured to determine a signal to interference ratio, SINR, between the network node and each of the plurality of user equipment devices, and determine what percentage of user equipment devices have a SINR above a predetermined SINR value. The control unit 105 is configured to control one or more amplifiers $101_1$ to $101_N$ to operate in a reduced power mode instead of a predistortion mode if the determined percentage is above a threshold value. In one example, all of the amplifiers are controlled in this way.

According to one embodiment, the evaluation unit 103 is configured to determine a path loss between the network node and each of the plurality of user equipment devices, and determine what percentage of user equipment devices have a path loss below a predetermined path loss value. The control unit 105 is configured to control one or more amplifiers to operate in a reduced power mode instead of a predistortion mode if the determined percentage is above a threshold value. In one example, all of the amplifiers are controlled in this way.

According to one embodiment, the evaluation unit 103 is configured to determine the location of each of the plurality of user equipment devices within the cell, and determine what percentage of user equipment devices are within a predetermined distance of the cell center. The control unit 105 is configured to control one or more amplifiers to operate in a reduced power mode instead of a predistortion mode if the determined percentage is above a threshold value.

As mentioned above, the reduced power mode may comprise a back-off mode of operation. The predistortion mode may comprise an amplifier linearization technique, a digital pre-distortion technique, DPD, a crossover digital predistortion technique, CO-DPD, or an analog pre-distortion technique, APD.

Figure 15:
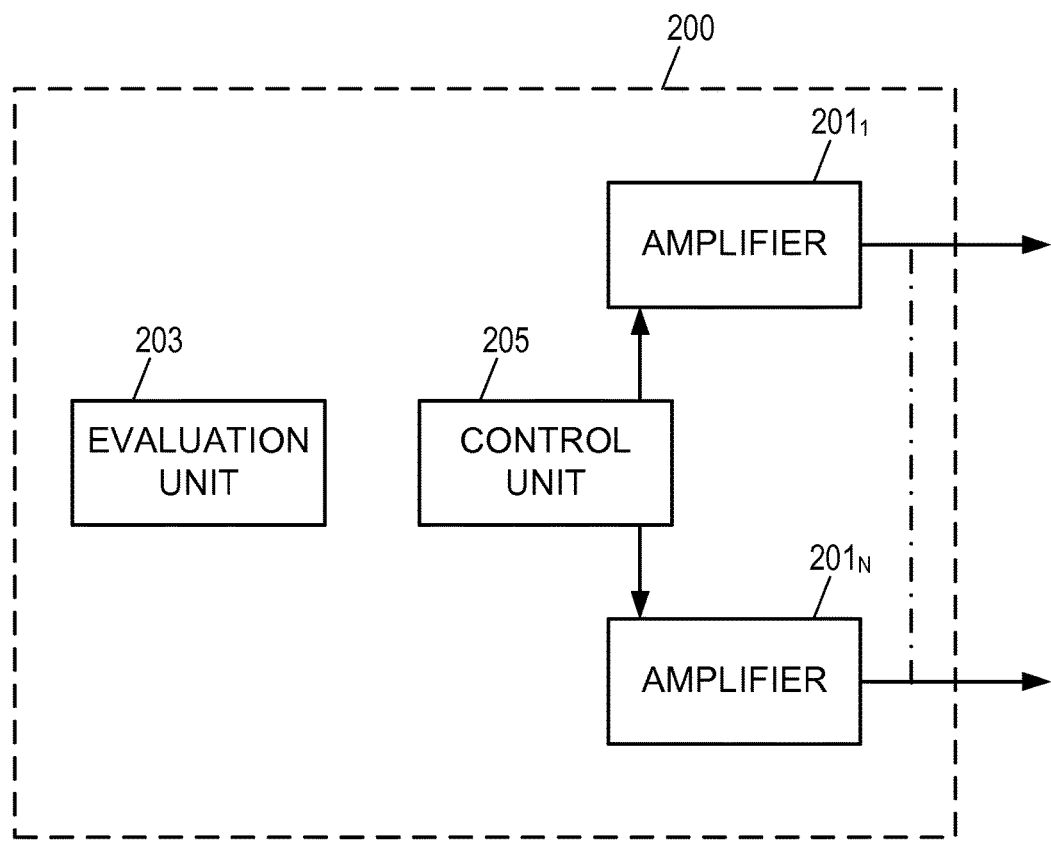
FIG. 15 shows an example of a user equipment device according to an embodiment.

FIG. 15 shows an example of a user equipment device 200 according to another embodiment. The user equipment device comprises one or more amplifiers $201_1$ to $201_N$ for communicating with a network node of a wireless communication network. The user equipment device 200 comprises an evaluation unit 203 configured to evaluate back-off criteria between the user equipment device 200 and the network node. The user equipment device comprises a control unit 205 configured to selectively control one or more amplifiers $201_1$ to $201_N$ to operate in a reduced power mode or a predistortion mode, based on the result of the evaluation.

In some embodiments, the evaluation unit 203 is configured to evaluate a signal to interference ratio, SINR, between the user equipment device 200 and the network node. In such embodiments the control unit 205 is configured to control one or more amplifiers $201_1$ to $201_N$ to operate in a reduced power mode instead of a predistortion mode if the evaluated SINR is above a threshold value.

In some embodiments the evaluation unit 203 is configured to evaluate a path loss between the user equipment device 200 and the network node. In such embodiments the control unit 205 is configured to control one or more amplifiers $201_1$ to $201_N$ to operate in a reduced power mode instead of a predistortion mode if the evaluated path loss is below a threshold value.

In some embodiments the evaluation unit 203 is configured to determine the location of the user equipment device 200 relative to the network node. In such embodiments the control unit 205 is configured to control one or more amplifiers $201_1$ to $201_N$ to operate in a reduced power mode instead of a predistortion mode if the user equipment device is within a predetermined distance of the network node.

In such user equipment devices as described above, the reduced power mode may comprise, for example, a back-off mode of operation, and/or wherein the predistortion mode may comprise, for example, an amplifier linearization technique, a digital pre-distortion technique, DPD, a crossover digital predistortion technique, CO-DPD, or an analog pre-distortion technique, APD.

The embodiments described herein provide solutions that help reduce the computational resources for pre-distortion techniques, such as digital pre-distortion, for example when a transmitter employs multiple antennas (antenna elements) and multiple amplifiers associated with the antenna elements, such as power amplifiers, while at the same time not having a negative impact on the coverage of a cell.

Some embodiments may be implemented in a network node (transmitter)) for downlink transmission or in a user equipment device (transmitter) for uplink transmission.

As described above, some embodiments relating to a method in a network node involve identifying the signal to interference ratios of the UEs and applying DPD/CO-DPD or power back based on the percentage of UE SINRs in the cell. Other methods in a network node involve identifying the path loss of the UEs in the cell and applying DPD/CO-DPD or power back-off based on the percentage of the UEs path loss in the cell.

Advantages with the proposed methods described here may include providing an efficient use of predistortion techniques, such as DPD techniques, by using less power for DPD operation. Computational complexity may also be reduced at the transmission side. The embodiments can also have an advantage of providing almost no coverage loss.

It is noted that references above to terminology such as a network node (for example a NodeB or eNode B) and user equipment devices (for example UE) should be considered to be non-limiting, and in particular do not imply a certain hierarchical relation between the two; in general a "network node" (e.g. NodeB) could be considered as device 1 and "user equipment device" (e.g. UE) device 2, and that these two devices communicate with each other over some radio channel. Herein, although certain embodiments focus on wireless transmissions in the downlink, the embodiments are equally applicable in the uplink. Furthermore, the embodiments are applicable for any wireless system, including future 5G systems.

In view of the above, references to predistortion, or linearization of an amplifier, include not only compensation techniques in the digital domain (as in DPD), but also similar concepts for analog predistortion (APD).

In some embodiments, to reduce the effects due to mutual coupling and nonlinearity, methods perform selective power back-off instead of DPD/CO-DPD. In these cases, the power of a power amplifier is backed off by a certain amount so that the power amplifier PA operates in the linear region of a typical AM/AM curve. Hence, the effects due to mutual coupling are minimal, thereby improving the ACLR. To minimize the coverage loss, the embodiments define a power back-off criteria, for determining when power reduction is to be used and when predistortion is to be used.

Figure 16:
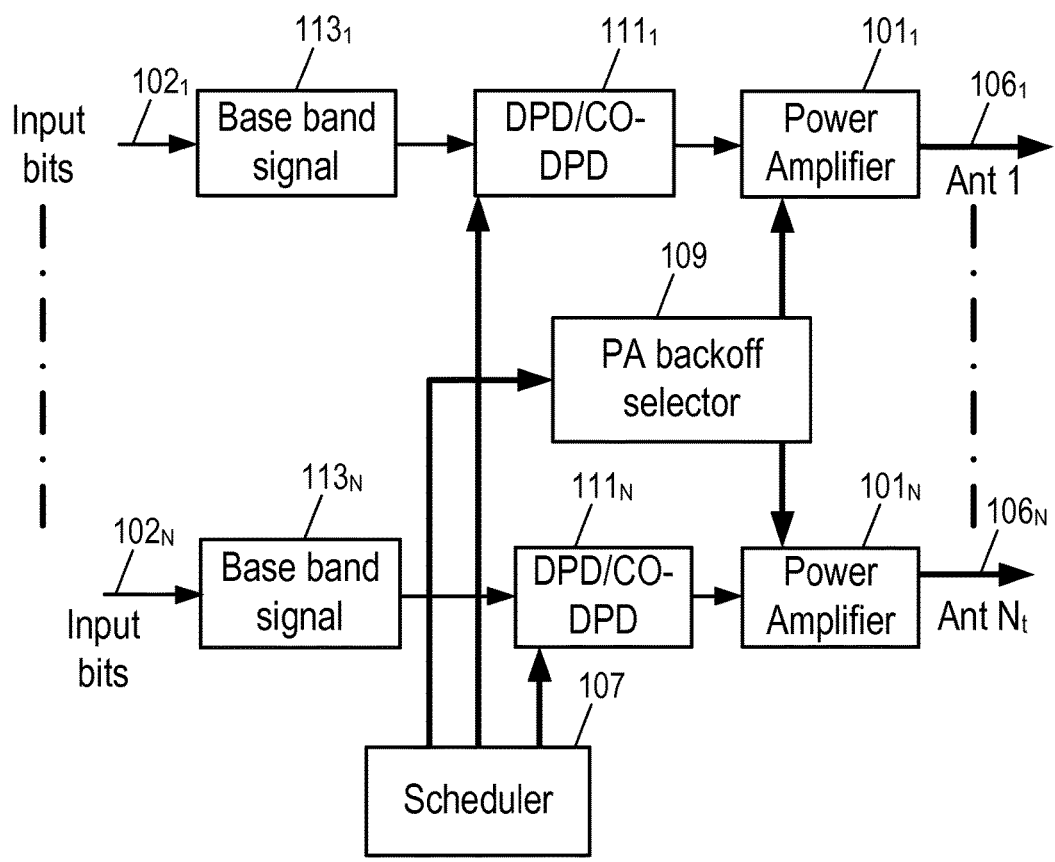
FIG. 16 shows an example of a network node according to an embodiment.

FIG. 16 shows a block diagram of an apparatus according to another embodiment. The apparatus comprises a plurality of amplifiers $101_1$ to $101_N$, for example power amplifiers, each generating a respective output signal $106_1$ to $106_N$ for a respective antenna element (not shown). The power amplifiers $101_1$ to $101_N$ amplify respective input signals $102_1$ to $102_N$, which are first converted to baseband signals by the plurality of baseband units $113_1$ to $113_N$. To provide linearization to the baseband signals prior to being amplified, the apparatus comprises a plurality of predistortion units $111_1$ to $111_N$, for example DPD and/or CO-DPD units. A power amplifier back-off selector 109 is configured to select how much back-off is to be applied (e.g. an amount of a back-off value), under control of a scheduler unit 107. The scheduler unit 107 may comprise a control module (not shown) for controlling whether the plurality of amplifiers operate in a predistortion mode, i.e. whereby input signals to the amplifiers are predistorted before being amplified, or in a power reduction mode, i.e. whereby the plurality of amplifiers are controlled to provide power back-off (and whereby the predistortion units $101_1$ to $101_N$ do not distort their respective signals). The scheduler unit 107 may also comprise an evaluation module (not shown), for evaluating one or more back-off criteria, as discussed in the previous embodiments, for determining whether a predistortion mode or a power reduction mode is to be used.

Figure 17:
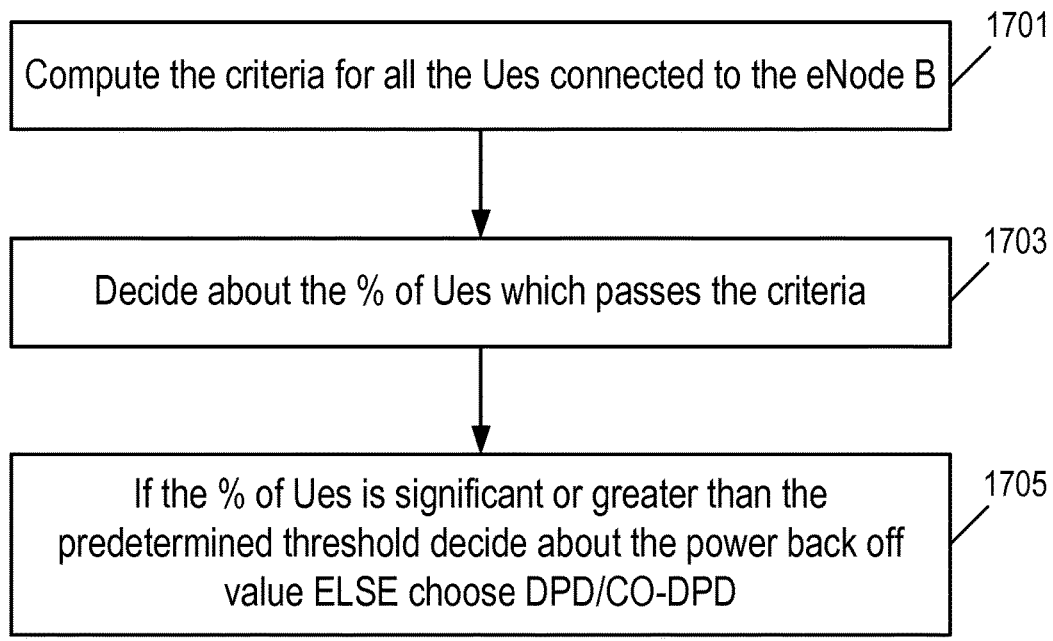
FIG. 17 shows an example of a method according to an embodiment.

FIG. 17 shows an example of a method according to another embodiment. In step 1701, the method computes the criteria for all the UEs connected to a network node, such as an eNodeB. In step 1703, the method comprises deciding about the percentage of UEs which pass the criteria. For example, as discussed earlier, this may comprise determine the percentage of UEs that have a certain SNIR value, and/or the percentage of UEs that have a certain path loss value, and/or the percentage of UEs that are within a certain distance of a cell centre. In step 1705 the percentage is evaluated and, if the percentage of UEs is significant or greater than a predetermined threshold, then a power back-off value is decided (for example for application by the PA back-off selector unit 109 of FIG. 16), else predistortion, such as DPD or CO-DPD for example is selected.

Figure 18:
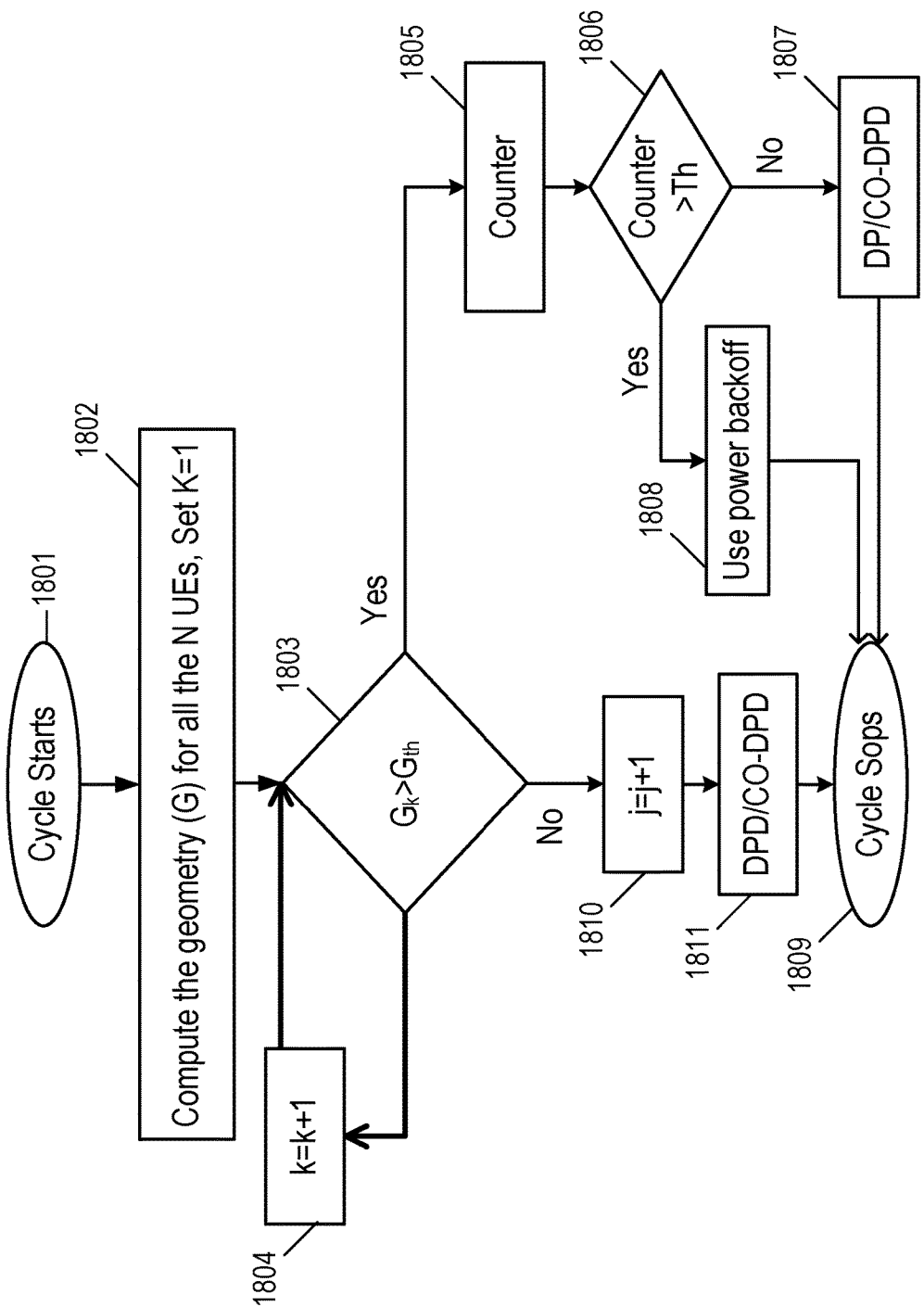
FIG. 18 shows an example of a method according to an embodiment.

FIG. 18 shows a more detailed example of a method for realizing some of the embodiments described above, for example those where the back-off criteria comprises positional or geometry information. The method starts at step 1801. In step 1802, the method computes the geometry (G) for all the plurality (e.g. N) of user equipment devises (UEs), and sets a value K=1.

In step 1803 the method determines, for each UE, whether the geometry $G_K$ is greater than a threshold value for the geometry $G_{th}$. For example, this may comprise determining whether a UE is within a predetermined distance of a cell centre. If the condition in step 1803 is met, in step 1805 a counter is incremented. In step 1806 it is determined whether the counter value is greater than a threshold vale "Th". If not (indicating that the percentage of UEs do not pass the back-off criteria relating to geometry) the method comprises using a predistortion mode in step 1807, and the cycle stops, step 1809.

If it is determined in step 1806 that the counter value is greater than the threshold value "Th", (e.g. indicating that the percentage of UEs do pass the back-off criteria relating to geometry) the method comprises using a power back-off mode in step 1808, and the cycle stops, step 1809.

If in step 1803 the method determines, for each UE, that the geometry $G_K$ is not greater than a threshold value for the geometry $G_{th}$ (for example, which indicates that a UE is not within a predetermined distance of a cell centre), in step 1810 a value "j" is incremented to "j+1", and in step 1811 the mode set to a predistortion mode (e.g. using DPD and/or CO-DPD), and the cycle stops, step 1809.

The comparison made in step 1803 can be repeated for different values of k, by making k=k+1.

Figure 19:
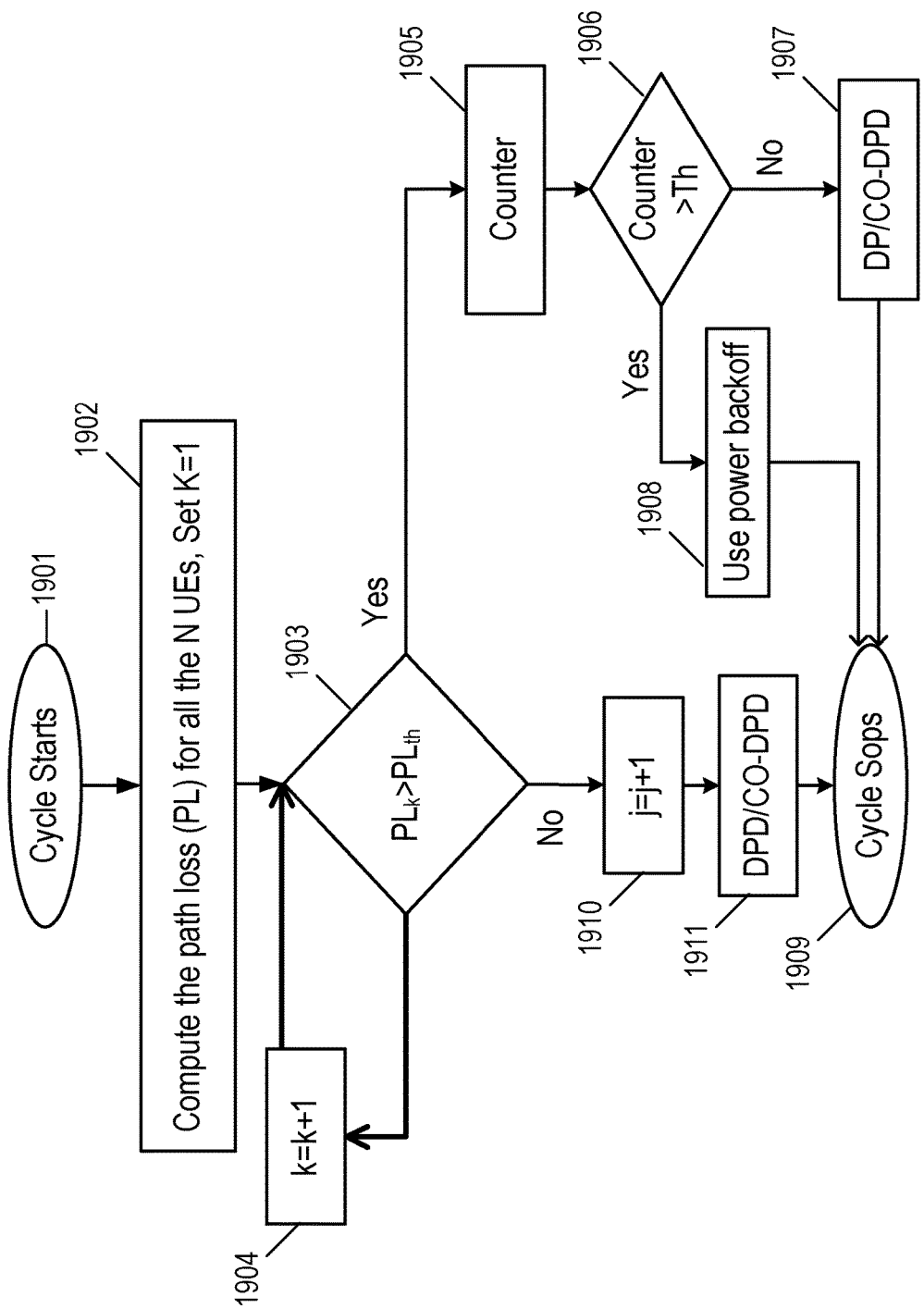
FIG. 19 shows an example of a method according to an embodiment.

FIG. 19 shows a more detailed example of a method for realizing some of the embodiments described above, for example those where the back-off criteria comprises a signal parameter such as path loss. A similar method may be used for other signal parameters, such as signal to interference ratio. The method starts at step 1901. In step 1902, the method computes the path loss (PL) for all the plurality (e.g. N) of user equipment devises (UEs), and sets a value K=1.

In step 1903 the method determines, for each UE, whether the path loss $PL_K$ is greater than a threshold value for the path loss $PL_{th}$. For example, this may comprise determining whether a path loss of a particular UE with the network node is below a predetermined path loss. If the condition in step 1903 is met, in step 1905 a counter is incremented. In step 1906 it is determined whether the counter value is greater than a threshold vale "Th". If not (indicating that the percentage of UEs do not pass the back-off criteria relating to path loss) the method comprises using a predistortion mode in step 1907, for example DPD or CO-DPD, and the cycle stops, step 1909.

If it is determined in step 1906 that the counter value is greater than the threshold value "Th", (e.g. indicating that the percentage of UEs do pass the back-off criteria relating to path loss) the method comprises using a power back-off mode in step 1908, and the cycle stops, step 1909.

If in step 1903 the method determines, for each UE, that the path loss $PL_K$ is not greater than a threshold value for the path loss $PL_{th}$ (for example, which indicates that a UE is not within a predetermined distance of a cell centre), in step 1910 a value "j" is incremented to "j+", and in step 1911 the mode set to a predistortion mode (e.g. using DPD and/or CO-DPD), and the cycle stops, step 1909.

The comparison made in step 1903 can be repeated for different values of k, by making k=k+1.

In the embodiments described above, the predetermined percentage of UEs depends on a particular implementation. For example, in one embodiment a value of 95% can be used to decide about the % of UEs. Other values may also be used in different embodiments.

Figure 20:
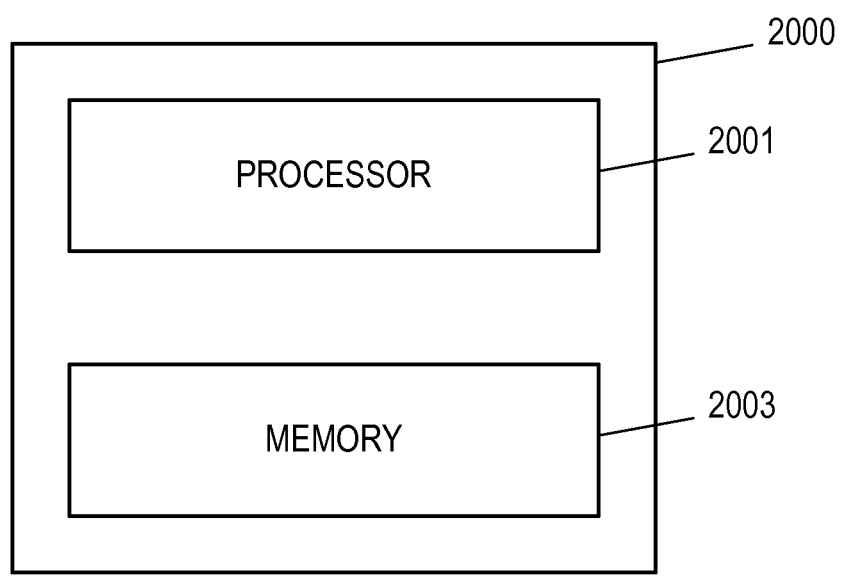
FIG. 20 shows an example of a network node or a user equipment device according to an embodiment.

FIG. 20 shows a network node 2000 according to another embodiment, which is adapted to communicate with a plurality of user equipment devices within a cell of a wireless communication network. The network node comprises a processor 2001 and a memory 2003, said memory 2003 containing instructions executable by said processor 2001. The wireless network node 2000 is operative to: evaluate back-off criteria relating to the plurality of user equipment devices; and control one or more amplifiers to operate in a reduced power mode or a predistortion mode, based on the result of the evaluation.

According to another embodiment, FIG. 20 shows a user equipment device 2000 which is adapted to communicate with a network node of a wireless communication network. The user equipment device 2000 comprises a processor 2001 and a memory 2003, said memory 2003 containing instructions executable by said processor 2001. The user equipment device 2000 is operative to: evaluate back-off criteria between the user equipment device and the network node; and control one or more amplifiers to operate in a reduced power mode or a predistortion mode, based on the result of the evaluation.

According to another embodiment, there is provided a network node comprising a plurality of amplifiers, and adapted to communicate with a plurality of user equipment devices within a cell of a wireless communication network, the network node comprises a first module configured to evaluate back-off criteria relating to the plurality of user equipment devices; and a second module configured to control one or more amplifiers to operate in a reduced power mode or a predistortion mode, based on the result of the evaluation.

According to another embodiment, there is provided a user equipment device comprising a plurality of amplifiers, and adapted to communicate with a network node of a wireless communication network, the user equipment device comprising a first module configured to evaluate back-off criteria between the user equipment device and the network node; and a second module configured to control one or more amplifiers to operate in a reduced power mode or a predistortion mode, based on the result of the evaluation.

In one example, a method comprises in a transmission node, performing power back-off or DPD/CO-DPD by choosing criteria based on downlink and uplink measurements.

As seen above, a network node may use one or more back-off criteria for determining whether to use power back-off or a DPD/CO-DPD technique. Example of such criteria are: geometry or signal to interference ratio of the UE, path loss of the UE, or a combination of criteria.

It is noted that the various embodiments described above can be combined in any form of combination, such that any combination of criteria can be used to select the back-off selection. Furthermore, any combination of downlink or uplink measurements can be used to determine such criteria.

It is noted that, in any of the embodiments described herein, selecting to use a predistortion mode may comprise a further step of selecting between one particular type of predistortion mode and another (or multiple other) predistortion mode(s), for example selecting between DPD or CO-DPD. Such a decision may be based, for example, on the level of mutual coupling in a particular antenna array system.

Furthermore, the evaluation of back-off criteria, and selection of an appropriate mode, may be performed periodically, at predefined intervals during operation.

In other embodiments, the evaluation of back-off criteria, and selection of an appropriate mode, may be performed dynamically, for example in response to a trigger event, such as a change is a network configuration, or upon determining a significant change in the number of UEs connected to a cell.

The above sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description above the term user equipment (UE) or user equipment device is used, it should be understood by the skilled in the art that "UE" or "user equipment device" is a non-limiting term comprising any mobile device, communication device, wireless communication device, terminal device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the general terms "terminal device", "communication device" and "wireless communication device" are used in the following description, and it will be appreciated that such a device may or may not be 'mobile' in the sense that it is carried by a user. Instead, the term "terminal device" (and the alternative general terms set out above) encompasses any device that is capable of communicating with communication networks that operate according to one or more mobile communication standards, such as the Global System for Mobile communications, GSM, UMTS, Long-Term Evolution, LTE, etc. A UE may comprise a Universal Subscription Identity Module (USIM) on a smart-card or implemented directly in the UE, e.g., as software or as an integrated circuit. The operations described herein may be partly or fully implemented in the USIM or outside of the USIM.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method of controlling at least one amplifier of a network node, the network node being configured to communicate with a plurality of user equipment devices within a cell of a wireless communication network, the method comprising:

evaluating back-off criteria relating to the plurality of user equipment devices, wherein the back-off criteria comprises positional information relating to the position of the plurality of user equipment devices within the cell; and selectively controlling at least one amplifier to operate in one of a reduced power mode and a predistortion mode, based on the result of the evaluation, wherein the method further comprises:

determining the location of each of the plurality of user equipment devices within the cell;

determining what percentage of user equipment devices are within a predetermined distance of the cell center; and controlling at least one amplifier to operate in the reduced power mode instead of the predistortion mode if the determined percentage is above a threshold value.

2. The method as claimed in claim 1, wherein the back-off criteria relates to a signal quality parameter between the network node and the plurality of user equipment devices.

3. The method as claimed in claim 2, wherein the signal quality parameter comprises at least one taken from the group consisting of:

a signal to interference ratio (SINR) between the network node and the user equipment devices; and a path loss between the network node and the user equipment devices.

4. The method as claimed in claim 1, further comprising:

determining a signal to interference ratio (SINR) between the network node and each of the plurality of user equipment devices;

determining what percentage of user equipment devices have a SINR above a predetermined SINR value; and controlling at least one amplifier to operate in the reduced power mode instead of a predistortion mode if the determined percentage is above a threshold value.

5. The method as claimed in claim 1, further comprising:

determining a path loss between the network node and each of the plurality of user equipment devices;

determining what percentage of user equipment devices have a path loss below a predetermined path loss value; and controlling at least one amplifier to operate in the reduced power mode instead of the predistortion mode if the determined percentage is above a threshold value.

6. The method as claimed in claim 1, wherein the reduced power mode comprises a back-off mode of operation.

7. The method as claimed in claim 1, wherein the predistortion mode comprises one of an amplifier linearization technique, a digital pre-distortion technique (DPD), a crossover digital predistortion technique (CO-DPD) and an analog pre-distortion technique (APD).

8. A network node comprising at least one amplifier, the network node being configured to communicate with a plurality of user equipment devices within a cell of a wireless communication network, the network node comprising:

an evaluation unit configured to evaluate back-off criteria relating to the plurality of user equipment devices; and a control unit configured to selectively control at least one amplifier to operate in one of a reduced power mode and a predistortion mode, based on the result of the evaluation, wherein the evaluation unit is further configured to determine the location of each of the plurality of user equipment devices within the cell, and determine what percentage of user equipment devices are within a predetermined distance of the cell center; and wherein the control unit is further configured to control at least one amplifier to operate in the reduced power mode instead of the predistortion mode if the determined percentage is above a threshold value.

9. The network node as claimed in claim 8, wherein:

the evaluation unit is further configured to determine a signal to interference ratio (SINR) between the network node and each of the plurality of user equipment devices, and determine what percentage of user equipment devices have a SINR above a predetermined SINR value; and the control unit is configured to control at least one amplifier to operate in the reduced power mode instead of the predistortion mode if the determined percentage is above a threshold value.

10. The network node as claimed in claim 8, wherein:

the evaluation unit is further configured to determine a path loss between the network node and each of the plurality of user equipment devices, and determine what percentage of user equipment devices have a path loss below a predetermined path loss value; and the control unit is configured to control at least one amplifier to operate in the reduced power mode instead of the predistortion mode if the determined percentage is above a threshold value.

11. The network node as claimed in claim 8, wherein the reduced power mode comprises a back-off mode of operation.

12. The network node as claimed in claim 8, wherein the predistortion mode comprises one of an amplifier linearization technique, a digital pre-distortion technique (DPD), a crossover digital predistortion technique (CO-DPD) and an analog pre-distortion technique (APD).

13. A user equipment device comprising at least one amplifier for communicating with a network node of a wireless communication network, the user equipment device comprising:

an evaluation unit configured to evaluate back-off criteria between the user equipment device and the network node; and a control unit configured to selectively control at least one amplifier to operate in one of a reduced power mode and a predistortion mode, based on the result of the evaluation, wherein the evaluation unit is further configured to determine the location of the user equipment device relative to the network node; and wherein the control unit is further configured to control at least one amplifier to operate in the reduced power mode instead of the predistortion mode if the user equipment device is within a predetermined distance of the network node.

14. The user equipment device as claimed in claim 13, wherein:

the evaluation unit is configured to evaluate a signal to interference ratio (SINR) between the user equipment device and the network node; and the control unit is configured to control at least one amplifier to operate in the reduced power mode instead of the predistortion mode if the evaluated SINR is above a threshold value.

15. The user equipment device as claimed in claim 13, wherein:

the evaluation unit is further configured to evaluate a path loss between the user equipment device and the network node; and the control unit is configured to control at least one amplifier to operate in the reduced power mode instead of the predistortion mode if the evaluated path loss is below a threshold value.

16. The user equipment device as claimed in claim 13, wherein at least one of:

the reduced power mode comprises a back-off mode of operation; and the predistortion mode comprises one of an amplifier linearization technique, a digital pre-distortion technique (DPD), a crossover digital predistortion technique (CO-DPD) and an analog pre-distortion technique (APD).

\* \* \* \* \*